(12) United States Patent
Pei et al.

(10) Patent No.: US 12,394,103 B2
(45) Date of Patent: Aug. 19, 2025

(54) CLASS-SPECIFIC NEURAL NETWORK FOR VIDEO COMPRESSED SENSING

(71) Applicants: KWAI INC., Palo Alto, CA (US); SANTA CLARA UNIVERSITY, Santa Clara, CA (US)

(72) Inventors: Yifei Pei, Santa Clara, CA (US); Ying Liu, Santa Clara, CA (US); Nam Ling, Santa Clara, CA (US); Lingzhi Liu, San Jose, CA (US); Yongxiong Ren, San Jose, CA (US); Ming Kai Hsu, Fremont, CA (US)

(73) Assignees: KWAI INC., Palo Alto, CA (US); SANTA CLARA UNIVERSITY, Santa Clara, CA (US)

( * ) Notice: Subject to any disclaimer, the term of this patent is extended or adjusted under 35 U.S.C. 154(b) by 603 days.

(21) Appl. No.: 17/695,684

(22) Filed: Mar. 15, 2022

(65) Prior Publication Data

US 2022/0292727 A1    Sep. 15, 2022

Related U.S. Application Data

(60) Provisional application No. 63/161,431, filed on Mar. 15, 2021.

(51) Int. Cl.
*G06K 9/00* (2022.01)
*G06T 9/00* (2006.01)
*H04N 19/176* (2014.01)
*H04N 19/625* (2014.01)

(52) U.S. Cl.
CPC ........... *G06T 9/002* (2013.01); *H04N 19/176* (2014.11); *H04N 19/625* (2014.11)

(58) Field of Classification Search
None
See application file for complete search history.

(56) References Cited

U.S. PATENT DOCUMENTS

| 2015/0222859 A1* | 8/2015 | Schweid | G06V 20/52 348/148 |
| 2021/0185276 A1* | 6/2021 | Peters | G06V 20/41 |

FOREIGN PATENT DOCUMENTS

| CA | 3138340 A1 * | 12/2020 | A61M 5/1723 |

OTHER PUBLICATIONS

Cheng "Learned Image Compression with Discretized Gaussian Mixture Likelihoods and Attention Modules", arXiv:2001.01568v3, Mar. 30, 2020. (Year: 2020).*

* cited by examiner

*Primary Examiner* — Wei Wen Yang
(74) *Attorney, Agent, or Firm* — Arch & Lake LLP

(57) ABSTRACT

A class-specific neural network for video compressed sensing and methods for training and testing the class-specific neural network are provided. The class-specific neural network includes a Gaussian-mixture model (GMM) and a plurality of encoders, where the GMM classifies video frame blocks with a plurality of clusters and assigns the video frame blocks to the plurality of clusters. Further, the plurality of encoders receive the video frame blocks and generate a plurality of compressed-sensed frame block vectors, where the plurality of encoders correspond to the plurality of clusters.

7 Claims, 6 Drawing Sheets

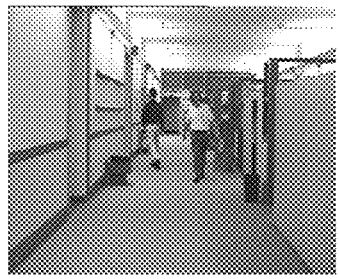 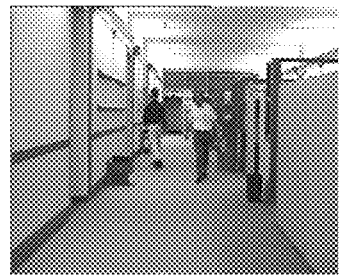 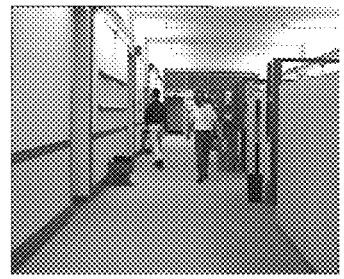
Fig. 2A　　　　　　　　Fig. 2B　　　　　　　　Fig. 2C
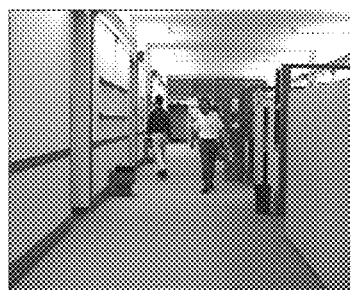 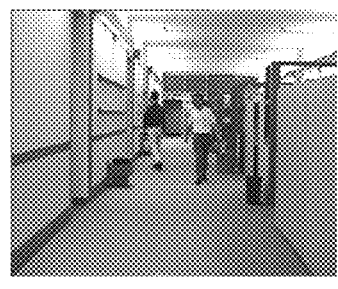
Fig. 2D　　　　　　　　Fig. 2E

CLASS-SPECIFIC NEURAL NETWORK FOR VIDEO COMPRESSED SENSING

CROSS-REFERENCE TO RELATED APPLICATION

The present application claims priority to U.S. Provisional Application No. 63/161,431, entitled "CLASS-SPECIFIC NEURAL NETWORK FOR VIDEO COMPRESSED SENSING," filed on Mar. 15, 2021, the entirety of which is incorporated by reference for all purposes.

FIELD

The present disclosure relates to video compressed sensing, and in particular but not limited to, class-specific neural networks, and methods for training and testing the class-specific neural networks for video compressed sensing.

BACKGROUND

The Shannon-Nyquist sampling theory indicates that to recover a signal accurately, a signal needs to be sampled at least twice the highest frequency present in the signals, resulting in large samples with redundant information. Compressed sensing is proposed to achieve sampling and compression steps at one time. Compressed sensing is an effective solution for signal acquisition and signal reconstruction at a much lower rate than the Nyquist rate. Traditional methods, such as orthogonal matching pursuits and basis pursuit, for image compressed sensing reconstruction requires huge reconstruction time, and bring low qualities of reconstructed images. Researchers now focus on deep learning methods to achieve high reconstruction quality of images at a fast speed. However, deep learning for image compressed sensing has not yet considered the similarities between images or the contents within images; thus, poorly performing as the images become complex. One way to know the types of images or image blocks is through the Gaussian-mixture model. However, if neural networks are tailored to different classes of images or image blocks, there is a need to record the class label information to inform the decoder, which requires extra bits.

SUMMARY

The present disclosure provides examples of techniques relating to a neural network architecture utilizing the class labels of video frame blocks for image compressed sensing without recording the class label information.

According to a first aspect of the present disclosure, there is provided a class-specific neural network for video compressed sensing. The class-specific neural network may include a Gaussian-mixture model (GMM) and a plurality of encoders. The GMM classifies video frame blocks with a plurality of clusters and assigns the video frame blocks to the plurality of clusters. Further, the plurality of encoders receive the video frame blocks and generate a plurality of compressed-sensed frame block vectors, where the plurality of encoders correspond to the plurality of clusters.

According to a second aspect of the present disclosure, there is provided a method for training a class-specific neural network for video compressed sensing. The method includes: training a GMM in the class-specific neural network using a plurality of video frame blocks, where the GMM includes a plurality of clusters; assigning the plurality of video frame blocks to the plurality of clusters; and training a plurality of encoders that correspond to the plurality of clusters using the plurality of video frame blocks.

According to a third aspect of the present disclosure, there is provided a method for testing a class-specific neural network for video compressed sensing. The method includes that: a trained GMM in the class-specific neural network assigns and sends a plurality of video frame blocks to a plurality of clusters; and a plurality of encoders in the class-specific neural network generate a plurality of compressed-sensed frame block vectors.

According to a fourth aspect of the present disclosure, there is provided an apparatus for training a class-specific neural network for video compressed sensing. The apparatus includes one or more processors and a memory configured to store instructions executable by the one or more processors. Further, the one or more processors, upon execution of the instructions, are configured to: train a GMM in the class-specific neural network using a plurality of video frame blocks, where the GMM includes a plurality of clusters; assign the plurality of video frame blocks to the plurality of clusters; and train a plurality of encoders that correspond to the plurality of clusters using the plurality of video frame blocks.

According to a fifth aspect of the present disclosure, there is provided an apparatus for testing a class-specific neural network for video compressed sensing. The apparatus includes one or more processors and a memory configured to store instructions executable by the one or more processors. Further, the one or more processors, upon execution of the instructions, are configured to: assign and send, by a trained GMM, in the class-specific neural network, a plurality of vectorized video frame blocks to corresponding clusters; and generate, by a plurality of encoders in the class-specific neural network, a plurality of compressed-sensed frame block vectors.

According to a sixth aspect of the present disclosure, there is provided a non-transitory computer-readable storage medium storing a bitstream that, when executed by one or more computer processors, causing the one or more computer processors to: train a GMM in a class-specific neural network using a plurality of video frame blocks, where the GMM includes a plurality of clusters; assign the plurality of video frame blocks to the plurality of clusters; and train a plurality of encoders that correspond to the plurality of clusters using the plurality of video frame blocks.

According to a seventh aspect of the present disclosure, there is provided a non-transitory computer-readable storage medium storing a bitstream that, when executed by one or more computer processors, causing the one or more computer processors to: assign and send, by a trained GMM in a class-specific neural network, a plurality of video frame blocks to a plurality of clusters; and generate, by a plurality of encoders in the class-specific neural network, a plurality of compressed-sensed frame block vectors.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

FIG. 2A illustrates an original frame of Hall Monitor.

FIG. 2B illustrates a selected reconstructed frame of Hall Monitor at the sampling rate 0.10 based on a CSNet model.

FIG. 2C illustrates a selected reconstructed frame of Hall Monitor at the sampling rate 0.10 based on a SparseNet model.

FIG. 2D illustrates a selected reconstructed frame of Hall Monitor at the sampling rate 0.10 based on a model with 2 clusters in accordance with some implementations of the present disclosure.

FIG. 2E illustrates a selected reconstructed frame of Hall Monitor at the sampling rate 0.10 based on a model with 6 clusters in accordance with some implementations of the present disclosure.

DETAILED DESCRIPTION

Figure 1:
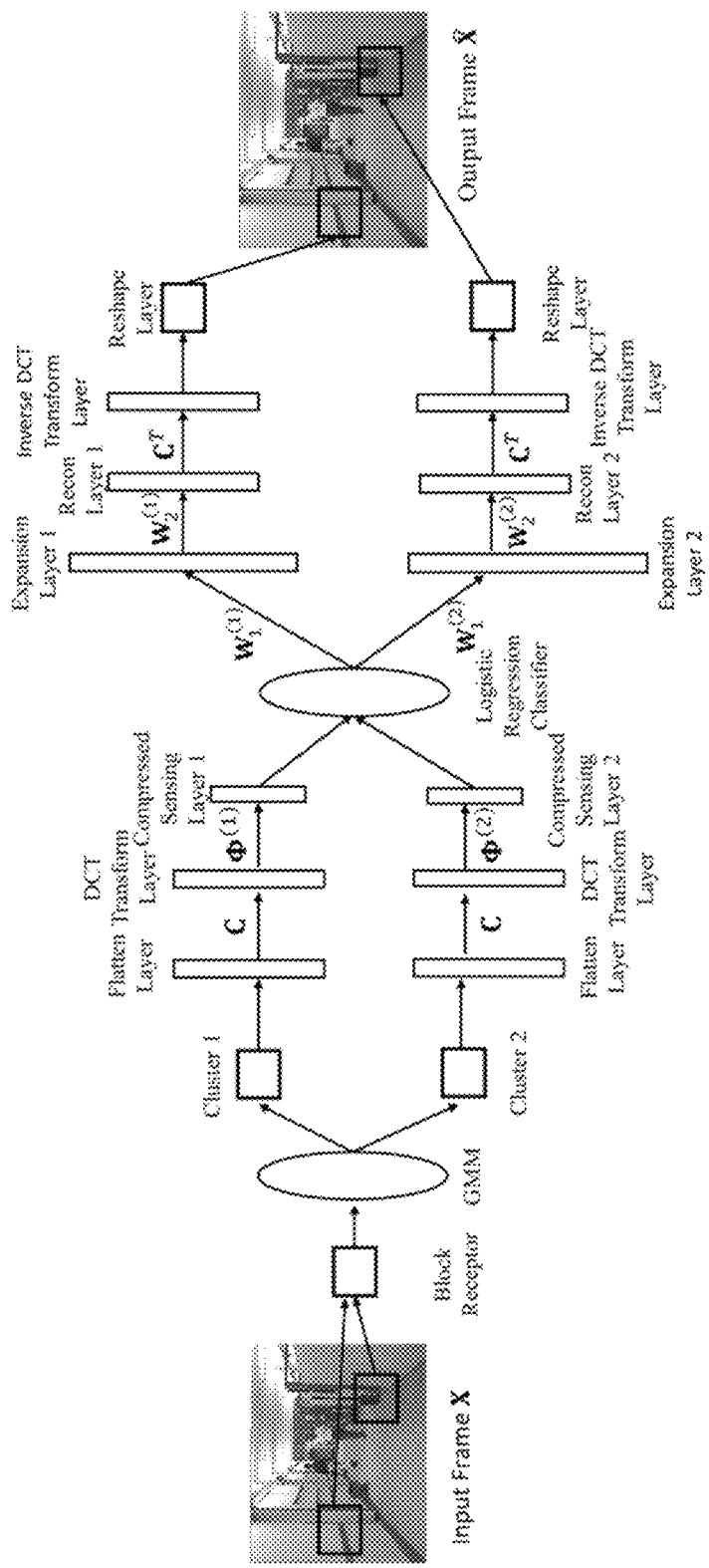
FIG. 1 is a block diagram illustrating an example class-specific neural network framework in accordance with some implementations of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," etc. are all used as nomenclature only for references to relevant elements, e.g., devices, components, compositions, steps, etc., without implying any spatial or chronological orders, unless expressly specified otherwise. For example, a "first device" and a "second device" may refer to two separately formed devices, or two parts, components, or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may comprise steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

This present disclosure provides a neural network framework that utilizes the similarities between image blocks through Gaussian-mixture models without recording the similarity information to achieve better reconstruction quality than the state-of-the-art neural network methods for block-level image compressed sensing.

Compressed sensing theory shows that an S-sparse signal $x \in \mathbb{R}^N$ is able to be compressed into a sampled vector $y \in \mathbb{R}^M$ by a matrix $\Phi \in \mathbb{R}^{M \times N}$, M<<N and can be recovered if $\Phi$ satisfies the restricted isometry property (RIP) of the order of 2k, that is:

$$(1-\delta_{2k})\|x\|_{l_2}^2$$

$$\leq \|\Phi x\|$$

$$\leq (1+\delta_{2k})\|x\|_{l_2}^2, \quad (1)$$

where $\delta_{2k}$ is the isometry constant. However, in images, pixels are not sparse, and some transforms are needed to represent x in sparse frequency s through $x=\psi s$. The recovery of x is equivalent to solving the $l_1$-norm based convex optimization problem:

$$\hat{s}=\mathrm{argmin}_s \|s\|_1 s.t.$$

$$y=\phi\psi s. \quad (2)$$

The basic idea of neural network for image compressed sensing is to train a measurement matrix $\Phi$ with the inverse transform matrix W collaboratively, so that, $\hat{x}=W(\Phi x)$. A first existing method uses n fully-connected neural network layers with weights $W^{(1)}, W^{(2)}, \ldots, W^{(n)}$ of these layers, and the non-linear activation function, Relu, in a layer with more nodes for reconstruction. It achieved better reconstruction results than traditional methods and with a fast speed. A second existing method applies the sparse transform matrix, such as discrete cosine transform (DCT) matrix and the inverse sparse transform matrix to video frames such that the neural network utilizes the properties of compressed sensing, that is, s must be sparse so to achieve satisfying results. However, the existing models are relatively simple and cannot perform well if images become complex. Both the first and second existing methods are performed at block-level. Block-level compressed sensing brings several benefits: (1) it saves the space of transform matrices given that transform matrices are applied to image blocks with small magnitudes rather than the whole images with hundreds of times of magnitudes; (2) it solves the issues when training data are not sufficient as splitting the whole images to blocks increases the number of datapoints. Some other methods applied to whole images use deep convolutional neural networks, which typically have a few convolutional layers with hundreds of feature maps in each convolutional layer. However, these approaches require large amount of training data, and the complicated tuning of network hyperparameters.

The present disclosure provides an example class-specific neural network framework in FIG. 1. FIG. 1 is a block diagram illustrating an example class-specific neural network framework in accordance with some implementations of the present disclosure. A trained GMM predicts the blocks labels and sends the blocks to their belonged encoders to get the compressed-sensed vectors. A logistic regression classifier predicts the labels of compressed-sensed vectors and sends these vectors to their belonged decoders to complete the block reconstruction.

Gaussian-Mixture Model (GMM) for Block Classification

The GMM is based on the assumption that each datapoint from class k is generated by a mixture of K multivariate Gaussian distributions with the model parameter θ of a weight $\pi_k$, a mean vector $\mu_k$ and a covariance matrix $\Sigma_k$ for each cluster k=1:K. The GMM has constraints of $\Sigma_{k=1}^{K} \pi_k = 1$ and $0 \leq \pi_k \leq 1$. The probability density of the $i^{th}$ vectorized frame block $x_i$ under the class k is expressed as:

$$\mathcal{N}\left(x_i \mid \mu_k, \sum\nolimits_k\right) = \frac{1}{(2\pi)^{1/2}|\Sigma_k|^{1/2}} \exp\left(-\frac{1}{2}(x_i - \mu_k)^T \sum\nolimits_k^{-1}(x_i - \mu_k)\right). \quad (3)$$

The linear super-position of Gaussians is:

$$p(x_i \mid \theta) = \sum_{k=1}^{K} \pi_k \mathcal{N}\left(x_i \mid \mu_k, \sum\nolimits_k\right). \quad (4)$$

The predicted class label of $x_i$ is denoted as $z_i$. $z_i$ is computed using the maximum a posteriori probability (MAP) estimate:

$$z_i = \underset{k}{\arg\max} \log p(x_i \mid z_i = k, \theta) + \log p(z_i = k \mid \theta). \quad (5)$$

Class-Specific Neural Network for Block Compressed Sensing

The sampling ratio is denoted as R (R=M/N). The main parts of the proposed class-specific neural network may include: an input layer with $B^2$ nodes, where a block has a size of B×B; a flatten layer; a DCT transform layer with $B^2$ nodes using fixed parameters, that is, Kronecker product form of sparse transform matrix $C = D \otimes D^T$ applied to block vectors, where D is the discrete cosine transform (DCT) matrix applied to block matrices; a trainable compressed sensing layer with $B^2R$ nodes, R<<1; an expansion layer with $B^2T$ nodes, each followed by Relu activation function, T>>1; a trainable reconstruction layer with $B^2$ nodes; an inverse DCT transform layer with $B^2$ nodes using fixed parameters, $C^T$; and a reshape layer to convert predicted block vectors to predicted block matrices.

For K classes, the disclosed system trains K neural networks. For the $k^{th}$ class, the block of size B×B is denoted as $X_i^{(k)}$ and the corresponding neural network operation is denoted as $f^{(k)}(\cdot)$ The parameters for $\Phi^{(k)}$, $W_1^{(k)}$, and $W_2^{(k)}$ are updated by minimizing the mean-squared-error (MSE):

$$\Phi^{(k)}, W_1^{(k)}, W_2^{(k)} = \arg\min E \|f^{(k)}(X_i^{(k)}) - X_i^{(k)}\|_F^2. \quad (6)$$

Logistic Regression for the Classification of Compressed-Sensed Vector

Without recording the extra information for class labels of compressed-sensed vectors, the present disclosure provides a trained logistic regression to predict the class labels of compressed-sensed vectors.

For the $i^{th}$ compressed-sensed vector $y_i \in \mathbb{R}^{M \times 1}$, we denote the class label as $l_i$ and the parameter vector of the trained logistic regression for the $k^{th}$ class as $w_k$ (k=1:K). The probability of the compressed-sensed vector belonged to class k is:

$$p(l_i = k \mid y_i) = \exp(w_k^T y_i) / \exp\left(\sum_{k'=1}^{K} w_{k'}^T y_i\right), \quad (7)$$

where $\exp(\cdot)$ is the exponential function. The disclosed system maximizes $p(l_i = k \mid y_i)$ to get the predicted label $l_i$ of $y_i$.

Hashmap Data Structure to Accelerate Compressed Sensing Speed and Reconstruction Speed For a compressed-sensed vector y, the decoder needs to assign it to the corresponding $k^{th}$ decoder based on the label predicted by logistic regression, which takes time to switch between decoders. Hence, the disclosure provides a hashmap data structure so that we can decode a group of y vectors all at once. The disclosed system may group all compressed-sensed vectors into a matrix $Y \in \mathbb{R}^{n \times B^2 R}$ where n is the number of compressed-sensed vectors and $B^2R$ is the length of these vectors. The $k^{th}$ decoder is denoted as $F^{(k)}(\cdot)$, where k=1:K. The labels of the compressed-sensed vector elements of Y predicted by the trained logistic regression are saved in an 1D array 1. According to the class labels in 1, the disclosed system extracts the submatrix $Y^{(k)}$, which is formed by the compressed-sensed vectors from class k, k=1:K The disclosed system decodes the blocks from class k all-together through $\hat{X}^{(k)} = F^{(k)}(Y^{(k)})$ for k=1:K, where $\hat{X}^{(k)} \in \mathbb{R}^{n_k \times B \times B}$ is the decoded blocks from class k, and $n_k$ is the number of blocks from class k. In this way, the reconstruction speed is significantly accelerated.

Training and Testing of the Proposed Framework

Here, an example procedure is provided for training and testing of the disclosed class-specific neural network framework. The example procedure may be implemented in a computing device such as a computer, a server, or other electronic device including one or more processors. The one or more processors may include a CPU, a graphics processing unit (GPU), a Tensor Processing Unit (TPU), a DSP, or an application-specific integrated circuit (ASIC) accelerator.

Training may include: split training video frames into training frame blocks; use vectorized training frame blocks to train a GMM model that has K clusters (e.g., K=2) and assign the training frame blocks to their clusters; use training frame blocks in K clusters to train K neural networks; label compressed-sensed training frame block vectors according to their clusters; and train a logistic regression classifier for compressed-sensed frame block vectors based on their labels.

Testing may include: split testing video frames into testing frame blocks; send vectorized testing frame blocks to their clusters by the trained GMM and assign the testing frame blocks to their belonged clusters; get compressed-sensed frame block vectors by their corresponding encoders; send the compressed-sensed frame block vectors to the decoder. The decoder uses the trained logistic regression classifier to classify the label of the received vector, and assign it to the corresponding decoder to recover the frame block; re-group the reconstructed frame blocks to reconstruct the whole video frame.

The performance of the proposed Gaussian-awareness neural network may be evaluated using four CIF format video sequences. Each CIF video sequence has 300 frames and each frame has the size of 352×288×3. To simplify the experiments, luminance channel is only used, resulting in each frame of size of 352×288×1. For each dataset, 150 frames are randomly selected as the training dataset, 60 frames are randomly selected as the validation dataset, and 90 frames are randomly selected as the testing dataset. The video sequences in training dataset and validation dataset are split into 16×16 overlapped blocks with a split step of 8. For the testing dataset, the frames are split into 16×16 nonoverlapped blocks. All blocks are in training and testing sets to train the Gaussian-mixture model as we assume we have them. For the neural network training, we set the epoch as 150, the batch size as 64, and use the Adam optimizer. For each training epoch, validation dataset is used to do validation and save the best model till that training epoch. The model based on the proposed class-specific neural network is compared with the block-based CSNet and SparseNet at sampling rates (R=M/N) of 0.05, 0.10, 0.15, 0.20 and 0.25. Peak signal-to-noise ratio (PSNR) is used as the quality evaluation metric. It is defined as PSNR=$20 \cdot \log_{10}$(MAX)–$10 \cdot \log_{10}$(MSE) [dB], where MAX is the maximum pixel intensity 255, and MSE is mean-squared-error between original frame pixel intensity and reconstructed frame pixel intensity.

TABLE 1

| Method | Time [seconds] |
| --- | --- |
| CSNet | 7.79 |
| SparseNet | 9.22 |
| GMMNet(k = 2) | 12.69 |
| GMMNet(k = 3) | 15.62 |
| GMMNet(k = 4) | 19.44 |

TABLE 1-continued

| Method | Time [seconds] |
| --- | --- |
| GMMNet(k = 5) | 23.13 |
| GMMNet(k = 6) | 26.37 |

Table 1 shows the total reconstruction time (without GPU) for 90 testing frames of Hall Monitor at R=0.10. Although the proposed approach is slower than CSNet and SparseNet because the proposed approach needs to complete the reconstruction of one class of frame blocks before reconstructing another class of frame blocks using one processor, the proposed approach has higher PSNR than the CSNet. Note that the reconstruction procedures for different classes of frame blocks can be paralleled to reduce the total reconstruction time.

Figure 3A:
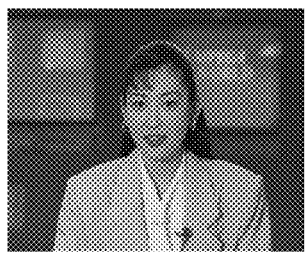
FIG. 3A illustrates an original frame of Akiyo.
Figure 3B:
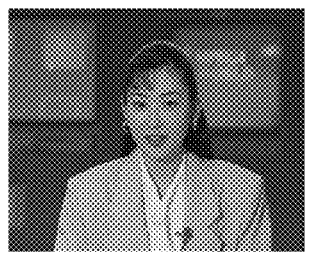
FIG. 3B illustrates a selected reconstructed frame of Akiyo at the sampling rate 0.20 based on a CSNet model.
Figure 3C:
FIG. 3C illustrates a selected reconstructed frame of Akiyo at the sampling rate 0.20 based on a SparseNet model.
Figure 3D:
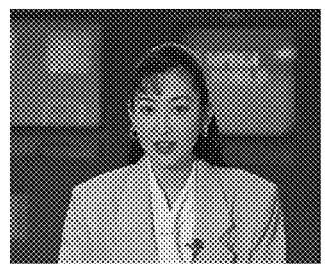
FIG. 3D illustrates a selected reconstructed frame of Akiyo at the sampling rate 0.20 based on a model with 2 clusters in accordance with some implementations of the present disclosure.
Figure 3E:
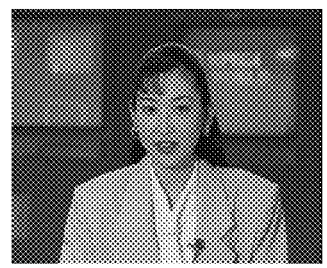
FIG. 3E illustrates a selected reconstructed frame of Akiyo at the sampling rate 0.20 based on a model with 6 clusters in accordance with some implementations of the present disclosure.

FIGS. 2A-2E and FIGS. 3A-3E show the visual quality of selected reconstructed frame of Hall Monitor and Container video sequences at the sampling rates at 0.10 and 0.20 under different methods. As shown in FIG. 2E and FIG. 3E, the proposed approach with k=6 achieves the best visual quality in terms of PSNR.

FIG. 2A illustrates an original frame of Hall Monitor. FIG. 2B illustrates a selected reconstructed frame of Hall Monitor at the sampling rate 0.10 based on a CSNet model with PSNR=34.57 dB. FIG. 2C illustrates a selected reconstructed frame of Hall Monitor at the sampling rate 0.10 based on a SparseNet model with PSNR=35.17 dB. FIG. 2D illustrates a selected reconstructed frame of Hall Monitor with PSNR=35.18 at the sampling rate 0.10 based on a model with 2 clusters in accordance with some implementations of the present disclosure. FIG. 2E illustrates a selected reconstructed frame of Hall Monitor with PSNR=37.16 at the sampling rate 0.10 based on a model with 6 clusters in accordance with some implementations of the present disclosure.

Further, FIG. 3A illustrates an original frame of Akiyo. FIG. 3B illustrates a selected reconstructed frame of Akiyo with PSNR=38.63 dB at the sampling rate 0.20 based on a CSNet model. FIG. 3C illustrates a selected reconstructed frame of Akiyo with PSNR=39.31 dB at the sampling rate 0.20 based on a SparseNet model. FIG. 3D illustrates a selected reconstructed frame of Akiyo with PSNR=39.93 dB at the sampling rate 0.20 based on a model with 2 clusters in accordance with some implementations of the present disclosure. FIG. 3E illustrates a selected reconstructed frame of Akiyo with PSNR=41.44 dB at the sampling rate 0.20 based on a model with 6 clusters in accordance with some implementations of the present disclosure.

Table 2 shows the average reconstruction PSNR values [dB] in the four video sequences at four sampling rates versus the sampling rate (R=M/N) of testing datasets. As cluster number k increases, PSNR is improved by 1.5 dB in Hall monitor, 0.5 dB in Foreman, 2.5 dB in Container, and 2.0 dB in Akiyo, compared to SparseNet.

TABLE 2

| Dataset | Method | R = 0.05 | R = 0.10 | R = 0.15 | R = 0.20 | R = 0.25 |
| --- | --- | --- | --- | --- | --- | --- |
| Hall | CSNet | 31.20 | 34.37 | 35.99 | 37.34 | 38.25 |
| monitor | SparseNet | 31.98 | 34.89 | 36.56 | 37.92 | 39.07 |
| | GMMNet(k = 2) | 32.54 | 35.15 | 36.82 | 38.21 | 39.36 |
| | GMMNet(k = 3) | 32.36 | 35.71 | 37.34 | 38.68 | 39.92 |
| | GMMNet(k = 4) | 33.19 | 35.86 | 37.52 | 38.81 | 40.07 |
| | GMMNet(k = 5) | 33.52 | 36.15 | 37.73 | 39.02 | 40.25 |
| | GMMNet(k = 6) | 33.75 | 36.26 | 37.80 | 39.06 | 40.25 |

TABLE 2-continued

| Dataset | Method | R = 0.05 | R = 0.10 | R = 0.15 | R = 0.20 | R = 0.25 |
|---|---|---|---|---|---|---|
| Foreman | CSNet | 29.11 | 31.23 | 32.59 | 32.96 | 34.16 |
| | SparseNet | 29.21 | 31.46 | 32.78 | 33.86 | 34.78 |
| | GMMNet(k = 2) | 29.35 | 31.58 | 32.91 | 33.99 | 34.98 |
| | GMMNet(k = 3) | 29.48 | 31.66 | 32.97 | 34.03 | 34.98 |
| | GMMNet(k = 4) | 29.58 | 31.70 | 32.94 | 34.09 | 35.08 |
| | GMMNet(k = 5) | 29.74 | 31.82 | 33.10 | 34.18 | 35.16 |
| | GMMNet(k = 6) | 29.81 | 31.84 | 33.13 | 34.22 | 35.15 |
| Container | CSNet | 28.74 | 30.85 | 31.43 | 33.46 | 34.16 |
| | SparseNet | 29.21 | 31.46 | 32.78 | 33.86 | 34.78 |
| | GMMNet(k = 2) | 30.04 | 32.68 | 34.35 | 35.65 | 36.93 |
| | GMMNet(k = 3) | 30.49 | 32.93 | 34.47 | 35.85 | 37.04 |
| | GMMNet(k = 4) | 30.98 | 33.42 | 34.95 | 36.31 | 37.46 |
| | GMMNet(k = 5) | 31.26 | 33.59 | 35.05 | 36.35 | 37.55 |
| | GMMNet(k = 6) | 31.33 | 33.64 | 35.38 | 36.43 | 37.63 |
| Akiyo | CSNet | 34.35 | 37.43 | 39.03 | 40.04 | 40.98 |
| | SparseNet | 34.64 | 37.83 | 39.59 | 40.96 | 41.83 |
| | GMMNet(k = 2) | 35.64 | 38.74 | 40.47 | 41.82 | 42.97 |
| | GMMNet(k = 3) | 36.91 | 39.70 | 41.19 | 42.32 | 43.58 |
| | GMMNet(k = 4) | 37.24 | 39.97 | 41.45 | 42.61 | 43.80 |
| | GMMNet(k = 5) | 37.70 | 40.14 | 41.65 | 42.84 | 43.90 |
| | GMMNet(k = 6) | 37.89 | 40.26 | 41.73 | 42.97 | 44.02 |

The present disclosure provides a block-level deep learning compressed sensing framework that utilizes the types of frame blocks predicted by the Gaussian-mixture model. In some examples, the present disclosure provides Gaussian-mixture models to classify video frame blocks for optimizing end-to-end neural network architectures with different clusters. In some examples, the present disclosure provides a logistic regression classifier to provide class labels of compressed-sensed video frame block vectors for decoder without recording extra clustering information. In some examples, the present disclosure provides a hashmap data structure to accelerate compressed sensing and reconstruction speed significantly. The model achieves enhanced reconstruction quality for video frames but still at a fast speed. The proposed framework facilitates to including the similarities between blocks in neural network design for compressed sensing and even for some general image processing purposes.

Figure 4:
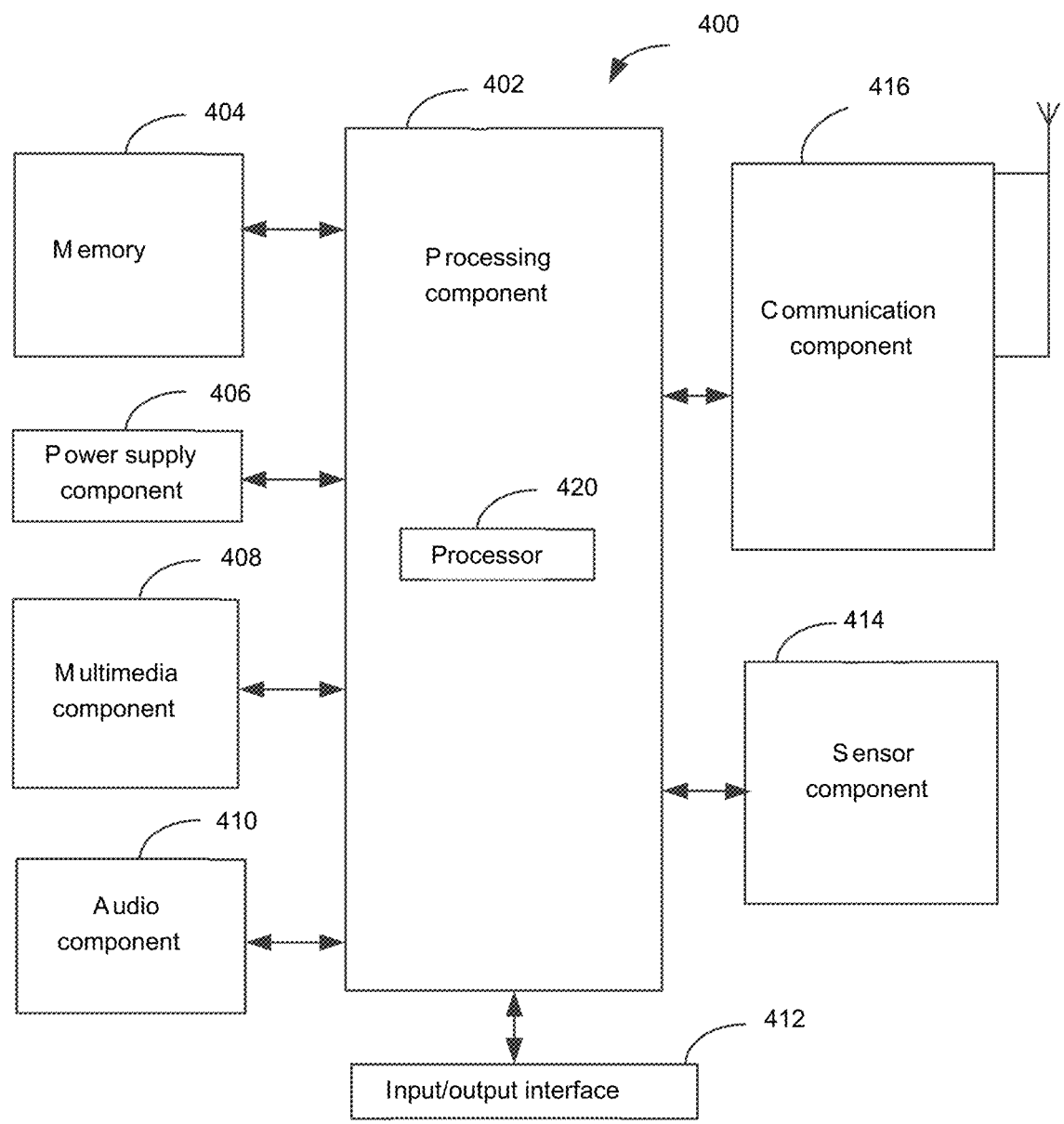
FIG. 4 is a block diagram illustrating an apparatus for video compressed sensing in accordance with some implementations of the present disclosure.

FIG. 4 is a block diagram illustrating an apparatus for video compressed sensing in accordance with some implementations of the present disclosure. The apparatus 400 may be a terminal, such as a mobile phone, a tablet computer, a digital broadcast terminal, a tablet device, or a personal digital assistant.

As shown in FIG. 4, the apparatus 400 may include one or more of the following components: a processing component 402, a memory 404, a power supply component 406, a multimedia component 408, an audio component 410, an input/output (I/O) interface 412, a sensor component 414, and a communication component 416.

The processing component 402 usually controls overall operations of the apparatus 400, such as operations relating to display, a telephone call, data communication, a camera operation, and a recording operation. The processing component 402 may include one or more processors 420 for executing instructions to complete all or a part of steps of the above method. Further, the processing component 402 may include one or more modules to facilitate interaction between the processing component 402 and other components. For example, the processing component 402 may include a multimedia module to facilitate the interaction between the multimedia component 408 and the processing component 402.

The memory 404 is configured to store different types of data to support operations of the apparatus 400. Examples of such data include instructions, contact data, phonebook data, messages, pictures, videos, and so on for any application or method that operates on the apparatus 400. The memory 404 may be implemented by any type of volatile or non-volatile storage devices or a combination thereof, and the memory 404 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 406 supplies power for different components of the apparatus 400. The power supply component 406 may include a power supply management system, one or more power supplies, and other components associated with generating, managing and distributing power for the apparatus 400.

The multimedia component 408 includes a screen providing an output interface between the apparatus 400 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 408 may include a front camera and/or a rear camera. When the apparatus 400 is in an operation mode, such as a shooting mode or a video mode, the front camera and/or the rear camera may receive external multimedia data.

The audio component 410 is configured to output and/or input an audio signal. For example, the audio component 410 includes a microphone (MIC). When the apparatus 400 is in an operating mode, such as a call mode, a recording mode and a voice recognition mode, the microphone is configured to receive an external audio signal. The received audio signal may be further stored in the memory 404 or sent via the communication component 416. In some examples, the audio component 410 further includes a speaker for outputting an audio signal.

The I/O interface 412 provides an interface between the processing component 402 and a peripheral interface module. The above peripheral interface module may be a keyboard, a click wheel, a button, or the like. These buttons may include but not limited to, a home button, a volume button, a start button, and a lock button.

The sensor component 414 includes one or more sensors for providing a state assessment in different aspects for the apparatus 400. For example, the sensor component 414 may detect an on/off state of the apparatus 400 and relative locations of components. For example, the components are a display and a keypad of the apparatus 400. The sensor component 414 may also detect a position change of the apparatus 400 or a component of the apparatus 400, presence or absence of a contact of a user on the apparatus 400, an orientation or acceleration/deceleration of the apparatus 400, and a temperature change of apparatus 400. The sensor component 414 may include a proximity sensor configured to detect presence of a nearby object without any physical touch. The sensor component 414 may further include an optical sensor, such as a CMOS or CCD image sensor used in an imaging application. In some examples, the sensor component 414 may further include an acceleration sensor, a gyroscope sensor, a magnetic sensor, a pressure sensor, or a temperature sensor.

The communication component 416 is configured to facilitate wired or wireless communication between the apparatus 400 and other devices. The apparatus 400 may access a wireless network based on a communication standard, such as WiFi, 4G, or a combination thereof. In an example, the communication component 416 receives a broadcast signal or broadcast related information from an external broadcast management system via a broadcast channel. In an example, the communication component 416 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the apparatus 400 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors, or other electronic elements to perform the above method. A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk, etc.

FIG. 1 shows an example framework of a class-specific neural network for video compressed sensing. As shown in FIG. 1, the class-specific neural network may include a block receptor, a GMM, Cluster 1, Cluster 2, and two encoders that respectively correspond to Cluster 1 and Cluster 2. The block receptor receives the input frame X and sends video frame blocks to the GMM. The GMM classifies the video frame blocks with two clusters and assigns the video frame blocks to Cluster 1 and Cluster 2. As shown in FIG. 1, Cluster 1 and Cluster 2 are respectively corresponding to an encoder. Cluster 1 corresponds to an encoder including a flatten layer, a DCT transform layer, and a compressed sensing layer 1. Cluster 2 corresponds to another encoder including a flatten layer, a DCT transform layer, and a compressed sensing layer 2.

Further, the class-specific neural network may include a logistic regression classifier that predicts labels for the plurality of compressed-sensed frame block vectors generated by the two encoders and sends the compressed-sensed frame block vectors to two decoders. The two decoders respectively correspond to Cluster 1 and Cluster 2. Each decoder may include an expansion layer, a trainable reconstruction layer, an inverse DCT transform layer and a reshape layer that converts the plurality of compressed-sensed frame block vectors to a plurality of predicted block matrices.

Figure 5:
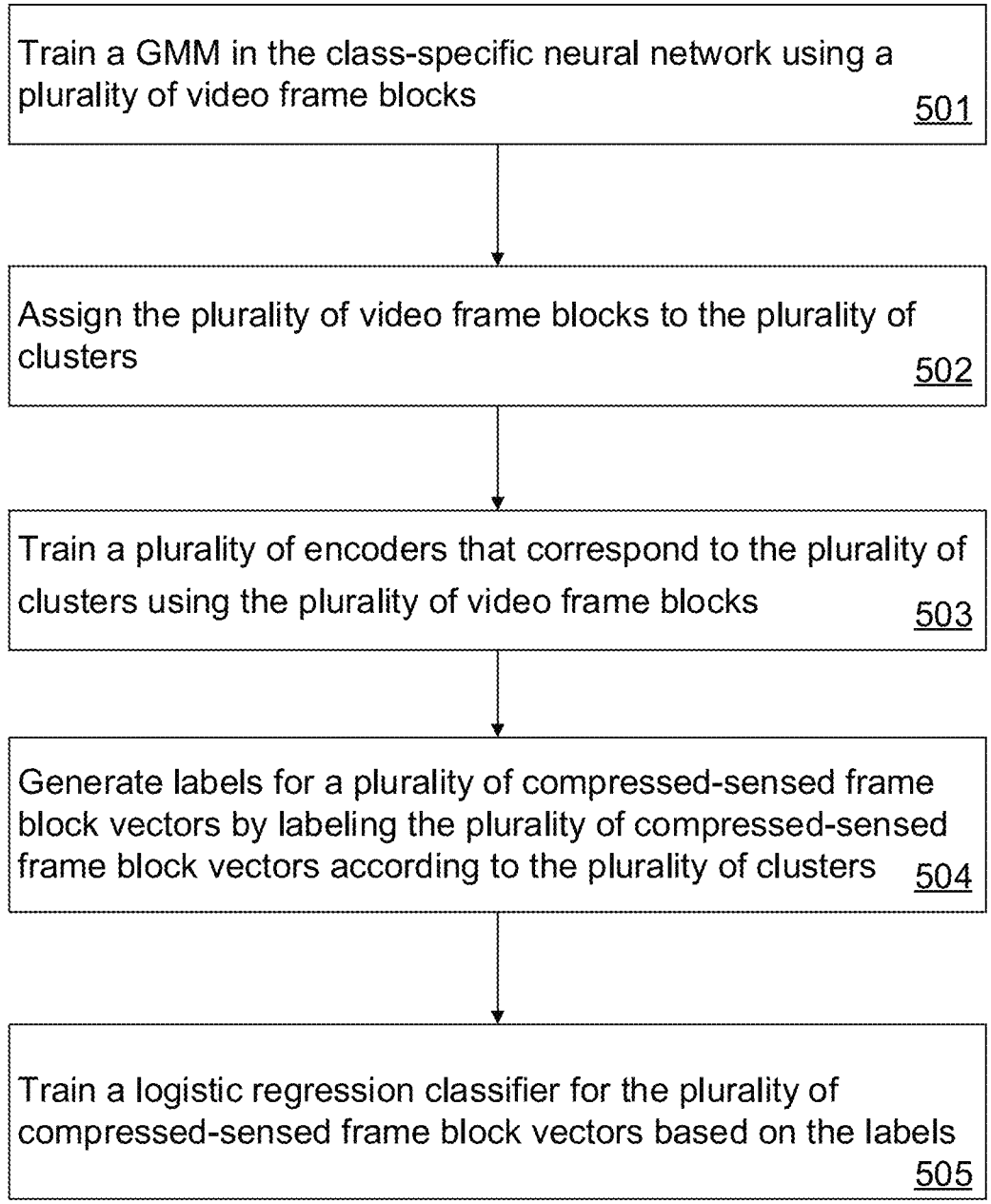
FIG. 5 is a flowchart illustrating a process for training a class-specific neural network for video compressed sensing in accordance with some implementations of the present disclosure.

FIG. 5 is a flowchart illustrating a process for training a class-specific neural network for video compressed sensing in accordance with some implementations of the present disclosure.

In step 501, the processor 420 trains a GMM in the class-specific neural network using a plurality of video frame blocks, where the GMM may include a plurality of clusters.

In some examples, the class-specific neural network may have a structure as shown in FIG. 1.

In step 502, the processor 420 assigns the plurality of video frame blocks to the plurality of clusters. As shown in FIG. 1, the class-specific neural network includes two clusters for illustration purpose. The number of clusters is not limited to two.

In step 503, the processor 420 trains a plurality of encoders that correspond to the plurality of clusters using the plurality of video frame blocks.

In some examples, the processor 420 may further generate labels for a plurality of compressed-sensed frame block vectors by labeling the plurality of compressed-sensed frame block vectors according to the plurality of clusters, as shown in step 504.

Further, the processor 420 may further train a logistic regression classifier for the plurality of compressed-sensed frame block vectors based on the labels, as shown in step 505.

In some examples, the logistic regression classifier may predict the labels by respectively maximizing probabilities of the plurality of compressed-sensed frame block vectors.

Figure 6:
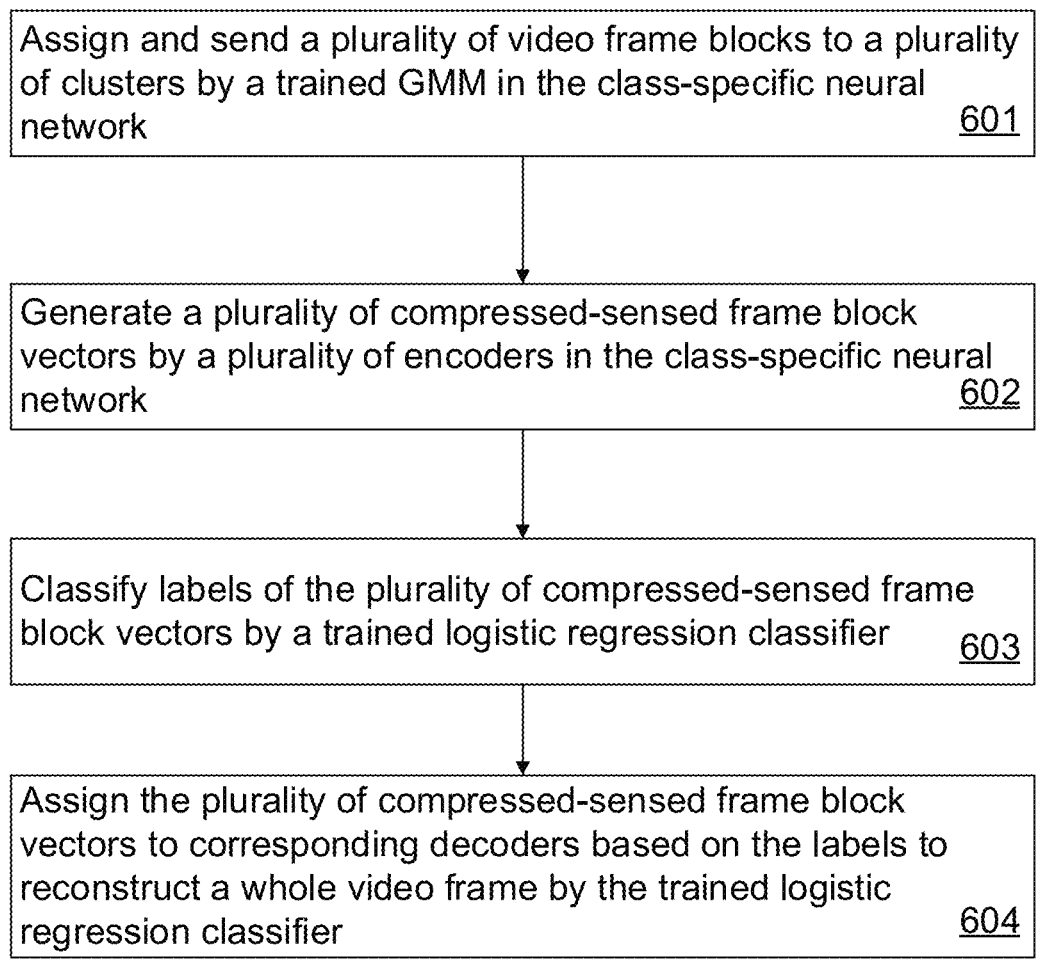
FIG. 6 is a flowchart illustrating a process for testing a class-specific neural network for video compressed sensing in accordance with some implementations of the present disclosure.

FIG. 6 is a flowchart illustrating a process for testing a class-specific neural network for video compressed sensing in accordance with some implementations of the present disclosure.

In step 601, the processor 420 assigns and sends a plurality of video frame blocks to a plurality of clusters by a trained GMM in the class-specific neural network.

In step 602, the processor 420 generates a plurality of compressed-sensed frame block vectors by a plurality of encoders in the class-specific neural network.

In some examples, the processor 420 may further classify labels of the plurality of compressed-sensed frame block vectors by a trained logistic regression classifier, as shown in step 603.

In some examples, the processor 420 may further assign the plurality of compressed-sensed frame block vectors to corresponding decoders based on the labels to reconstruct a whole video frame by the trained logistic regression classifier, as shown in step 604.

In some examples, the plurality of compressed-sensed frame block vectors may be assigned to the plurality of decoders based on the labels saved in a hashmap data structure.

In some other examples, there is provided a non-transitory computer readable storage medium 404, having instructions stored therein. When the instructions are executed by one or more processors 420, the instructions cause the processor to perform any method as described in FIGS. 5-6 and above.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for video compressed sensing by a class-specific neural network, comprising:
   classifying, by a Gaussian-mixture model (GMM), video frame blocks with a plurality of clusters and assigning the video frame blocks to the plurality of clusters;
   receiving, by a plurality of encoders, the video frame blocks;
   generating, by the plurality of encoders, a plurality of compressed-sensed frame block vectors, wherein the plurality of encoders respectively correspond to the plurality of clusters,
   wherein each encoder comprises a flatten layer, a discrete cosine transform (DCT) transform layer, and a trainable compressed sensing layer;
   predicting, by a logistic regression classifier, class labels for the plurality of compressed-sensed frame block vectors without recording clustering information, wherein the logistic regression classifier predicts the class labels by respectively maximizing probabilities of the plurality of compressed-sensed frame block vectors;
   sending, by the logistic regression classifier, the compressed-sensed frame block vectors to a plurality of decoders, and
   wherein the plurality of compressed-sensed frame block vectors are assigned to the plurality of decoders based on the class labels for the plurality of compressed-sensed frame block vectors, wherein the class labels are saved in a hashmap data structure.

2. The method of claim 1, wherein the GMM predicts labels for the video frame blocks.

3. The method of claim 1, wherein each decoder comprises an expansion layer, a trainable reconstruction layer, an inverse DCT transform layer, and a reshape layer that converts the plurality of compressed-sensed frame block vectors to a plurality of predicted block matrices.

4. A method for training a class-specific neural network for video compressed sensing, comprising:
   training a Gaussian-mixture model (GMM) in the class-specific neural network using a plurality of video frame blocks, wherein the GMM comprises a plurality of clusters;
   assigning the plurality of video frame blocks to the plurality of clusters;
   training a plurality of encoders that respectively correspond to the plurality of clusters using the plurality of video frame blocks,
   wherein each encoder comprises a flatten layer, a discrete cosine transform (DCT) transform layer, and a trainable compressed sensing layer,
   generating class labels for a plurality of compressed-sensed frame block vectors by labeling the plurality of compressed-sensed frame block vectors according to the plurality of clusters;
   training a logistic regression classifier for the plurality of compressed-sensed frame block vectors based on the class labels without recording clustering information, wherein the logistic regression classifier predicts the labels by respectively maximizing probabilities of the plurality of compressed-sensed frame block vectors; and
   sending, by the logistic regression classifier, the compressed-sensed frame block vectors to a plurality of decoders,
   wherein the plurality of compressed-sensed frame block vectors are assigned to the plurality of decoders based on the class labels for the plurality of compressed-sensed frame block vectors, wherein the class labels are saved in a hashmap data structure.

5. A method for testing a class-specific neural network for video compressed sensing, comprising:
   assigning and sending, by a trained Gaussian-mixture model (GMM) in the class-specific neural network, a plurality of video frame blocks to a plurality of clusters;
   generating, by a plurality of encoders in the class-specific neural network, a plurality of compressed-sensed frame block vectors,
   wherein each encoder comprises a flatten layer, a discrete cosine transform (DCT) transform layer, and a trainable compressed sensing layer,
   classifying, by a trained logistic regression classifier, class labels of the plurality of compressed-sensed frame block vectors without recording clustering information, wherein the trained logistic regression classifier predicts the class labels by respectively maximizing probabilities of the plurality of compressed-sensed frame block vectors; and
   assigning, by the trained logistic regression classifier, the plurality of compressed-sensed frame block vectors to corresponding decoders based on the class labels to reconstruct a whole video frame,
   wherein the class labels are saved in a hashmap data structure.

6. An apparatus for training a class-specific neural network for video compressed sensing, comprising:
   one or more processors; and
   a memory configured to store instructions executable by the one or more processors,
   wherein the one or more processors, upon execution of the instructions, are configured to:
   train a Gaussian-mixture model (GMM) in the class-specific neural network using a plurality of video frame blocks, wherein the GMM comprises a plurality of clusters;
   assign the plurality of video frame blocks to the plurality of clusters;
   train a plurality of encoders that respectively correspond to the plurality of clusters using the plurality of video frame blocks, wherein each encoder comprises a flatten layer, a discrete cosine transform (DCT) transform layer, and a trainable compressed sensing layer, generate class labels for a plurality of compressed-sensed frame block vectors by labeling the plurality of compressed-sensed frame block vectors according to the plurality of clusters;

train a logistic regression classifier for the plurality of compressed-sensed frame block vectors based on the class labels without recording clustering information, wherein the logistic regression classifier predicts the labels by respectively maximizing probabilities of the plurality of compressed-sensed frame block vectors; and send, by the logistic regression classifier, the compressed-sensed frame block vectors to a plurality of decoders, wherein the plurality of compressed-sensed frame block vectors are assigned to the plurality of decoders based on the class labels for the plurality of compressed-sensed frame block vectors, wherein the class labels are saved in a hashmap data structure.

7. An apparatus for testing a class-specific neural network for video compressed sensing, comprising:

one or more processors; and a memory configured to store instructions executable by the one or more processors, wherein the one or more processors, upon execution of the instructions, are configured to:

assign and send, by a trained Gaussian-mixture model (GMM) in the class-specific neural network, a plurality of vectorized video frame blocks to corresponding clusters; and generate, by a plurality of encoders in the class-specific neural network, a plurality of compressed-sensed frame block vectors, wherein each encoder comprises a flatten layer, a discrete cosine transform (DCT) transform layer, and a trainable compressed sensing layer, classify, by a trained logistic regression classifier, class labels of the plurality of compressed-sensed frame block vectors without recording clustering information, wherein the trained logistic regression classifier predicts the class labels by respectively maximizing probabilities of the plurality of compressed-sensed frame block vectors; and assign, by the trained logistic regression classifier, the plurality of compressed-sensed frame block vectors to corresponding decoders based on the class labels to reconstruct a whole video frame, wherein the class labels are saved in a hashmap data structure.

* * * * *